(12) United States Patent
Rink et al.

(10) Patent No.: US 11,287,282 B2
(45) Date of Patent: Mar. 29, 2022

(54) METHOD FOR PROVIDING AND RECEIVING A VEHICLE POSITION, METHOD FOR CALCULATING A DRIVING TIME, NETWORKED DEVICE, AND STORAGE MEDIUM

(71) Applicant: Continental Teves AG & Co. oHG, Frankfurt am Main (DE)

(72) Inventors: Klaus Rink, Rodenbach (DE); Georg Fernkorn, Dingelstädt (DE)

(73) Assignee: Continental Teves AG & Co. oHG

( * ) Notice: Subject to any disclaimer, the term of this patent is extended or adjusted under 35 U.S.C. 154(b) by 101 days.

(21) Appl. No.: 16/492,353

(22) PCT Filed: Feb. 28, 2018

(86) PCT No.: PCT/DE2018/200020
§ 371 (c)(1),
(2) Date: Sep. 9, 2019

(87) PCT Pub. No.: WO2018/166568
PCT Pub. Date: Sep. 20, 2018

(65) Prior Publication Data
US 2021/0131824 A1    May 6, 2021

(30) Foreign Application Priority Data
Mar. 17, 2017   (DE) .................... 10 2017 204 460.8

(51) Int. Cl.
*G01S 19/49*     (2010.01)
*G01C 21/00*    (2006.01)
*G07C 5/00*     (2006.01)

(52) U.S. Cl.
CPC ..... *G01C 21/3889* (2020.08); *G01C 21/3848* (2020.08); *G01S 19/49* (2013.01); *G07C 5/008* (2013.01)

(58) Field of Classification Search
CPC ............ G01C 21/3889; G01C 21/3848; G07C 5/008; G01S 19/49
See application file for complete search history.

(56) References Cited

U.S. PATENT DOCUMENTS

| | | | |
|---|---|---|---|
| 9,377,315 B2 | 6/2016 | Grover et al. | |
| 10,191,918 B1* | 1/2019 | Siris | G06F 16/951 |
| 10,475,258 B1* | 11/2019 | Son | H04W 4/027 |
| 2001/0032236 A1 | 10/2001 | Lin | |
| 2002/0077876 A1* | 6/2002 | O'Meara | G06Q 10/06316 |
| | | | 705/7.15 |

(Continued)

OTHER PUBLICATIONS

German Search Report for German Application No. 10 2017 204 460.8, dated Dec. 1, 2017—10 pages.

(Continued)

*Primary Examiner* — Mathew Franklin Gordon
(74) *Attorney, Agent, or Firm* — RatnerPrestia

(57) ABSTRACT

The invention relates to a method for providing and receiving a vehicle position, which is based on raw satellite-navigation data and driving-dynamics data. The invention further relates to a method for calculating a driving time of a vehicle to a location of a networked end-user device on the basis of such a vehicle position. The invention further relates to an associated networked device and to an associated storage medium.

15 Claims, 1 Drawing Sheet

(56) References Cited

U.S. PATENT DOCUMENTS

| | | |
|---|---|---|
| 2012/0191341 A1 | 7/2012 | Nara et al. |
| 2012/0290652 A1 | 11/2012 | Boskovic et al. |
| 2015/0339928 A1 | 11/2015 | Ramanujam |
| 2016/0320195 A1 | 11/2016 | Liu et al. |
| 2017/0016994 A1 | 1/2017 | Buchholz et al. |
| 2017/0039667 A1 | 2/2017 | Kim |
| 2017/0314950 A1* | 11/2017 | Tian .................. G01C 21/3492 |
| 2017/0344911 A1* | 11/2017 | Shimura ............... G06F 16/252 |

OTHER PUBLICATIONS

International Search Report and Written Opinion for International Application No. PCT/DE2018/200020, dated May 30, 2018—9 pages.

* cited by examiner

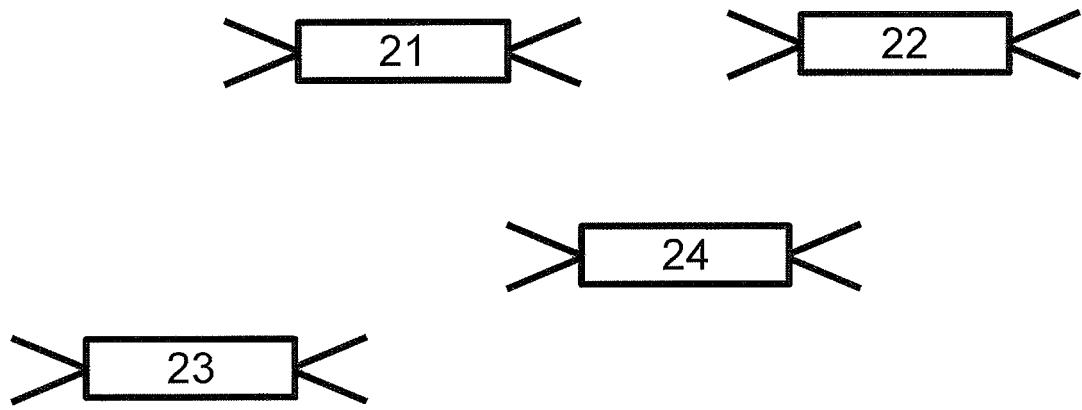
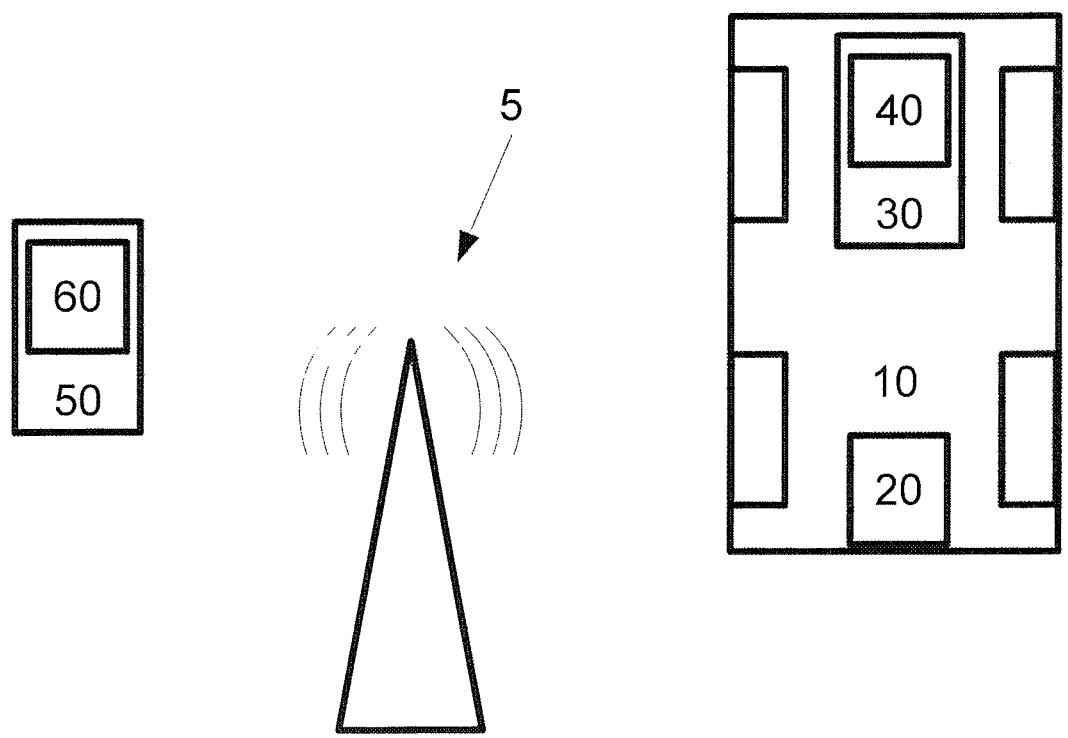

METHOD FOR PROVIDING AND RECEIVING A VEHICLE POSITION, METHOD FOR CALCULATING A DRIVING TIME, NETWORKED DEVICE, AND STORAGE MEDIUM

CROSS REFERENCE TO RELATED APPLICATIONS

This application is the U.S. National Phase Application of PCT International Application No. PCT/DE2018/200020, filed Feb. 28, 2018, which claims priority to German Patent Application No. 10 2017 204 460.8, filed Mar. 17, 2017, the contents of such applications being incorporated by reference herein.

FIELD OF THE INVENTION

The invention relates to a method for providing a vehicle position by a vehicle to a networked device. The invention further relates to a method for obtaining a vehicle position in a networked device. The invention further relates to a method for calculating a driving time of a vehicle to a location of a networked end user device. The invention further relates to an associated networked device and an associated storage medium.

BACKGROUND OF THE INVENTION

Methods which process a vehicle position are increasingly used, inter alia, in driving services. These are, for example, services offered in which a user may request by mobile telephone a vehicle driven by a driver and book a given journey. This may be used both in the context of conventional taxi services and also in the context of novel mobility services such as car sharing, car pools or other services.

It has been found that with known driving services and associated applications, which are for example run on mobile telephones, problems frequently arise when calculating arrival times or other journey-related information, the problems being caused by the fact that in downtown areas, where such services are typically used, a vehicle position is often not very readily available. This may lead to inaccuracies in vehicle positioning or in calculating a driving time or arrival time, which may lead to considerable dissatisfaction on the part of the respective user. It may for example arise that, on booking, a vehicle is displayed in the immediate vicinity on a map while in reality it is several hundred meters away. Corresponding waiting and search times are highly relevant with regard to total journey duration. The cost of a journey is also calculated on the basis of journey duration and distance covered. Here, too, errors in position calculation are serious.

SUMMARY OF THE INVENTION

Aspects of the invention are therefore directed to make available methods, devices and a storage medium which are improved with regard to positioning.

An aspect of the invention relates to a method for providing a vehicle position by a vehicle to a networked device. The method has the following steps:
establishing the vehicle position on the basis of raw satellite navigation data and driving dynamics data, and
sending the vehicle position to a networked device.

Using the method according to an aspect of the invention, the vehicle position, which is sent to a networked device, is generated not only by means of satellite navigation, but also by means of driving dynamics data. The vehicle position established in this way is considerably more accurate than if it were based merely on raw satellite navigation data, in particular if the vehicle is located in a neighborhood with difficult reception situations such as for example downtown areas.

One example of such establishment of vehicle position on the basis of raw satellite navigation data and driving dynamics data is in development at Continental AG in the form of an M2XPro algorithm.

A networked device may for example be a mobile telephone, a smartphone, a PC, a tablet, a notebook, a wearable or any other corresponding device. Typically, a networked device has the capacity for wireless and/or wired data exchange with other devices, in particular via a mobile radio network. A networked device typically further has the ability to determine its own location, in particular using satellite navigation and/or using other position finding methods.

An aspect of the invention further relates to a method for obtaining a vehicle position in a networked device. The method has the following step:
receiving a vehicle position sent according to the method just described by the networked device.

Using this method, a vehicle position may be received at a networked device, wherein the vehicle position advantageously has the considerably higher accuracy just described.

An aspect of the invention further relates to a method for calculating a driving time of a vehicle to a location of a networked end user device. The method has the following steps:
establishing the vehicle position on the basis of raw satellite navigation data and driving dynamics data,
sending the vehicle position to a networked vehicle device located in the vehicle,
establishing a user position of the networked end user device,
sending the vehicle position from the networked vehicle device to the networked end user device and/or sending the user position from the networked end user device to the networked vehicle device, and
calculating driving time on the basis of user position and vehicle position.

Using this method, a considerably more accurate driving time can be calculated for a vehicle than is the case with methods according to the prior art. This is explained in particular by the additional use of driving dynamics data, which allow considerably more accurate establishment of vehicle position. Typical problems which arise from the difficult reception situations for satellite signals in downtown areas may thus be avoided.

The networked end user device and the networked vehicle device are networked devices as described above. The above-stated embodiments apply mutatis mutandis.

The networked end user device is typically a device which is held or used by a user of a driving service. It is thus situated at the location to which a requested driving service vehicle has to drive to pick up the user. The networked vehicle device located in the vehicle is, on the other hand, typically a device operated by the driver of the corresponding vehicle.

The user position of the networked end user device may be established in particular by using satellite navigation and/or by using other navigation technologies.

The method furthermore preferably has the following step:

displaying the driving time on a display of the networked end user device.

This allows the user to be directly informed as to the expected driving time.

According to one embodiment, the step of calculating the driving time is carried out in the networked end user device. It may also be carried out in another device and be transmitted to the networked end user device.

According to one embodiment, the step of calculating the driving time is carried out in the networked vehicle device. It may also be carried out in another device and be transmitted to the networked vehicle device.

Typically, all the data mentioned, in particular the vehicle position and the user position, are transmitted to the device which performs the step of calculating the driving time.

The driving time may here be calculated in particular with the assistance of an electronic map or other information, for example about a traffic situation.

The method according to an aspect of the invention may in particular be performed in the context of a driving service. It may also be used to optimize navigation systems and other systems based on transmission of a position.

Preferably, an arrival time of the vehicle at the user position is calculated on the basis of the driving time. The method in this respect preferably further has the following step:

displaying the arrival time on a display of the networked end user device.

The end user is thus informed about the probable arrival time, such that they no longer have to work out the arrival time themselves. To this end, a current time may in particular be used to which, for example, the calculated driving time may be added.

The method further preferably has the following step:

displaying the vehicle position on the networked end user device.

This makes it possible for the user of the end user device to locate the vehicle in question and estimate its distance and journey duration or optionally also to find it as a pedestrian.

According to one further development, on establishing the vehicle position a confidence interval may be established for the vehicle position. This makes it possible to estimate the accuracy of the vehicle position and use it in calculations. Accordingly, the confidence interval may preferably also be transmitted on sending and/or receiving of the vehicle position. The confidence interval may thus accordingly also be used by devices other than the vehicle itself.

It is also preferable for a confidence interval for the driving time to be calculated on the basis of the confidence interval for the vehicle position. A statement may thus also be made about how reliable the planned driving time or arrival time is. This may accordingly be displayed to the user.

The sending or receiving mentioned here may proceed for example using technologies such as Bluetooth, Google Auto, Apple CarPlay, WiFi, NFC, mobile radio systems such as GPRS, EDGE, UMTS or LTE, or indeed via wired interfaces such as for example USB.

An aspect of the invention further relates to a networked device which is configured to perform a method according to an aspect of the invention. Use may here be made of all the embodiments and variants described herein.

An aspect of the invention further relates to a non-volatile computer-readable storage medium on which program code is stored, on execution of which a processor performs a method according to an aspect of the invention. Use may be made here too of all the embodiments and variants described herein.

The data discussed herein in relation to a vehicle position may also for example be used, for example, to supply a navigation system on a networked device with corresponding position data. This may for example be active in the foreground. In particular in the case of driving services, the navigation system of the vehicle may be bypassed, since integrated navigation of the driving service is needed in order to find car sharers and so as not to leave the pre-calculated route including price calculation.

Furthermore, services such as for example car sharing services or car renters may better determine the whereabouts of their vehicles and thus calculate the usage costs and availability in an optimized manner.

BRIEF DESCRIPTION OF THE DRAWINGS

A person skilled in the art will infer further features and advantages from the exemplary embodiment described below with reference to the appended drawing.

The FIGURE is a schematic representation of an arrangement for carrying out a method according to an aspect of the invention.

DETAILED DESCRIPTION OF THE PREFERRED EMBODIMENTS

The FIGURE is merely a schematic representation of components by means of which a method according to an aspect of the invention may be carried out according to one exemplary embodiment. This is described below.

The FIGURE is a schematic representation of a vehicle 10. This has a satellite navigation module 20. The satellite navigation module 20 is in a position to receive satellite navigation signals from satellites 21, 22, 23, 24, likewise depicted only schematically, and to calculate a vehicle position on the basis thereof. Furthermore, the satellite navigation module 20 is in a position to obtain driving dynamics data from vehicle sensors, not shown, of the vehicle 10 via a vehicle bus, likewise not shown, and thus calculate the vehicle position significantly even more accurately than would be possible merely by means of satellite navigation.

In the vehicle 10 there is a networked vehicle device in the form of a vehicle mobile telephone 30. This is a conventional commercial mobile telephone 30 with a display 40.

The vehicle 10 and the vehicle mobile telephone 30 are configured to communicate with one another via Bluetooth. In this way, the very accurate vehicle position just mentioned may be transmitted from the vehicle 10 to the vehicle mobile telephone 30. The latter thus has very accurate knowledge of the position of the vehicle 10.

Moreover, in the FIGURE a networked end user device is depicted in the form of a user mobile telephone 50, This too is a conventional commercial mobile telephone 50 with a display 60.

A mobile radio network 5 is also represented only schematically in the FIGURE. The two mobile telephones 30, 50 may communicate with one another by means of the mobile radio network 5. In this way, virtually any desired data can be exchanged.

The user mobile telephone 50 is in particular a mobile telephone, which is used by a user of a driving service of which the vehicle 10 is part. When the user of the user mobile telephone 50 inquires about a journey, the vehicle position is transmitted from the vehicle mobile telephone 30 to the user mobile telephone 50. The latter thus has accurate knowledge of the location of the vehicle 10. On the basis of this information and of the its own position, which may be calculated in known manner using satellite navigation, the user mobile telephone 50 may calculate a driving time of the vehicle 10 to the own position of the user mobile telephone 50. Use may here in particular be made of a digital road map in the user mobile telephone 50 or to be retrieved online. Other information such as for example current traffic information, which may in particular also be provided over the mobile radio network 5, may also be used to improve arrival time calculation.

The calculated arrival time may be displayed on the display 60, such that the user of the user mobile telephone 50 knows when to expect the vehicle 10 to arrive. Likewise, the own position of the user mobile telephone 50 may be transmitted to the vehicle mobile telephone 30 and displayed on the display 40. A route may likewise be displayed thereon which may be calculated using a digital map and which leads the driver of the vehicle 10 to the user of the user mobile telephone 50.

It should be mentioned that, in the satellite navigation module 20, a confidence interval for the vehicle position may also be established, wherein the confidence interval may also be transmitted to the vehicle mobile telephone 30 and via that also to the user mobile telephone 50. This enables calculation of a confidence interval for a calculated driving time or arrival time. A corresponding confidence interval or a reliability measure for the calculation may accordingly be displayed on the displays 40, 60.

The stated steps of the method according to an aspect of the invention may be performed in the stated order. They may, however, also be performed in a different order. In one of the embodiments of the method according to an aspect of the invention, the method may for example be performed with a specific combination of steps in such a manner that no further steps are performed. Further steps may, however, in principle also be performed, including some which have not been mentioned.

The claims belonging to the application do not amount to a renouncement of achieving more extensive protection.

If it turns out, over the course of the procedure, that a feature or a group of features is not absolutely necessary, then the applicant already requests now a wording of at least one independent claim in which the feature or group of features is no longer included. This may for example be a sub-combination of a claim present at the filing date or a sub-combination limited by further features of a claim present at the filing date. Such claims or combinations of features which are to be reworded should be understood also to be covered by the disclosure of this application.

It should also be pointed out that configurations, features and variants of aspects of the invention, which are described in the various embodiments or exemplary embodiments and/or shown in the FIGURES, may be combined together as desired. Individual or multiple features are interchangeable as desired. Resultant combinations of features should be understood also to be covered by the disclosure of this application.

Back-references in dependent claims should not be understood to amount to renouncing independent objective protection for the features of the back-referenced subclaims. These features may also be combined as desired with other features.

Features which are only disclosed in the description or features which are disclosed in the description or in a claim only in conjunction with other features may in principle independently have significance which is essential to aspects of the invention. They may therefore also be included individually in claims for the purpose of differentiation from the prior art.

The invention claimed is:

1. A method for providing a vehicle position by a vehicle to a networked device, the method comprising:
    calculating, by at least one processor, the vehicle position on the basis of:
        raw satellite navigation data from a satellite navigation receiver in the vehicle, and driving dynamics data, the driving dynamics data indicating driving dynamics of the vehicle sensed by vehicle sensors in the vehicle;
    calculating, by the at least one processor, a confidence interval for the vehicle position;
    calculating, by the at least one processor, a confidence interval for vehicle driving time based on the confidence interval for the vehicle position; and
    transmitting, by the at least one processor, the vehicle position and information indicating reliability of the vehicle driving time based on the confidence interval for the vehicle driving time to the networked device.

2. A method for obtaining a vehicle position in a networked device, the method comprising:
    receiving, by the networked device, the vehicle position sent in accordance with the method of claim 1.

3. A method for calculating a driving time of a vehicle to a location of a networked end user device, the method comprising:
    establishing, by at least one processor, a vehicle position on the basis of raw satellite navigation data from a satellite navigation receiver in the vehicle, and driving dynamics data, the driving dynamics data indicating driving dynamics of the vehicle sensed by vehicle sensors in the vehicle;
    calculating, by the at least one processor, a confidence interval for the vehicle position;
    calculating, by the at least one processor, a confidence interval for vehicle driving time based on the confidence interval for the vehicle position;
    sending, by the at least one processor, the vehicle position and information indicating reliability of the vehicle driving time based on the confidence interval for the vehicle driving time to a networked vehicle device located in the vehicle;
    establishing, by the at least one processor, a user position of the networked end user device;
    sending, by the at least one processor, the vehicle position and the information indicating reliability of the vehicle driving time based on the confidence interval for the vehicle driving time from the networked vehicle device to the networked end user device; and
    calculating, by the at least one processor, the driving time on the basis of user position and the vehicle position.

4. The method according to claim 3, further comprising:
    displaying the driving time on a display of the networked end user device.

5. The method according to claim 3, wherein the step of calculating the driving time is carried out in the networked end user device or is carried out in another device and transmitted to the networked end user device.

6. The method according to claim 3, wherein the step of calculating the driving time is carried out in the networked vehicle device or is carried out in another device and transmitted to the networked vehicle device.

7. The method according to claim 3, which is performed in the context of a driving service or is used to optimize navigation systems and other systems based on position transmission.

8. The method according to claim 3, wherein an arrival time of the vehicle at the user position is calculated on the basis of the driving time.

9. The method according to claim 8, further comprising:
  displaying the arrival time on a display of the networked end user device.

10. The method according to claim 3, further comprising:
  displaying the vehicle position on the networked end user device.

11. A networked device configured to perform a method according to claim 1.

12. A non-volatile computer-readable storage medium, on which program code is stored, on execution of which a processor performs a method according to claim 1.

13. The method according to claim 1, wherein a confidence interval for the driving time is calculated on the basis of the confidence interval for the vehicle position.

14. The method according to claim 4, wherein the step of calculating the driving time is carried out in the networked end user device or is carried out in another device and transmitted to the networked end user device.

15. The method according to claim 4, wherein the step of calculating the driving time is carried out in the networked vehicle device or is carried out in another device and transmitted to the networked vehicle device.

\* \* \* \* \*